United States Patent
Nikander

(10) Patent No.: US 9,641,064 B2
(45) Date of Patent: May 2, 2017

(54) ELEVATOR LINE BRIDGE FILTER FOR COMPENSATING REACTIVE POWER IN A GRID

(71) Applicant: KONE Corporation, Helsinki (FI)

(72) Inventor: Juhamatti Nikander, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 422 days.

(21) Appl. No.: 14/475,310

(22) Filed: Sep. 2, 2014

(65) Prior Publication Data

US 2015/0060209 A1 Mar. 5, 2015

(30) Foreign Application Priority Data

Sep. 3, 2013 (EP) ..................................... 13182791

(51) Int. Cl.
*B66B 1/28* (2006.01)
*H02M 1/42* (2007.01)
*H02J 3/18* (2006.01)
*B66B 1/34* (2006.01)

(52) U.S. Cl.
CPC .............. *H02M 1/4208* (2013.01); *B66B 1/34* (2013.01); *H02J 3/1892* (2013.01)

(58) Field of Classification Search
CPC ........ H02M 1/4208; B66B 1/34; H02J 3/1892
USPC ....... 187/247, 277, 289, 293, 296, 297, 391, 187/393; 318/59, 61, 64, 66, 268, 270, 318/729, 799–815; 323/205, 207, 209, 323/210; 363/39, 40, 43, 47, 48, 53, 77, 363/123
See application file for complete search history.

(56) References Cited

U.S. PATENT DOCUMENTS

| | | | | |
|---|---|---|---|---|
| 4,677,364 A * | 6/1987 | Williams | ............... | H02J 3/1864 318/729 |
| 5,134,356 A * | 7/1992 | El-Sharkawi | ......... | H02J 3/1864 323/209 |
| 6,075,350 A * | 6/2000 | Peng | ..................... | H02J 3/1814 323/207 |
| 7,091,703 B2 * | 8/2006 | Folts | ..................... | H02J 3/1828 323/207 |
| 7,378,821 B2 * | 5/2008 | Simpson, III | ......... | H02J 3/1892 323/205 |

(Continued)

FOREIGN PATENT DOCUMENTS

EP          2 395 651 A2    12/2011
WO     WO 2007/077288 A1     7/2007

*Primary Examiner* — Anthony Salata
(74) *Attorney, Agent, or Firm* — Birch, Stewart, Kolasch & Birch, LLP

(57) ABSTRACT

The invention relates to a method and an electrical converter of an elevator. In the method a controller of the electrical converter determines a first reactive power produced by a smoothing filter using pre-determined information on impedance of the smoothing filter. The controller may also receive information on a second reactive power from a remote node over a communication channel, the second reactive power being produced to a grid. The controller adds the first reactive power and the second reactive power to yield a total reactive power. The controller requests the electrical converter to make a plurality of compensative connections in the converter matrix to compensate the first reactive power or the total reactive power.

20 Claims, 3 Drawing Sheets

(56) References Cited

U.S. PATENT DOCUMENTS

| | | | | |
|---|---|---|---|---|
| 7,638,966 B1* | 12/2009 | Pummer | .................... | G05F 1/70 |
| | | | | 318/438 |
| 8,403,112 B2* | 3/2013 | Bonanno | .................... | E04G 3/32 |
| | | | | 182/148 |
| 8,838,285 B2* | 9/2014 | Milosevic | ................. | H02J 3/00 |
| | | | | 700/286 |
| 9,046,077 B2* | 6/2015 | Kirchner | ............... | F03D 7/0284 |
| 2009/0001942 A1* | 1/2009 | Temma | ..................... | G05F 1/70 |
| | | | | 323/211 |

* cited by examiner

ELEVATOR LINE BRIDGE FILTER FOR COMPENSATING REACTIVE POWER IN A GRID

BACKGROUND OF THE INVENTION

Field of the Invention

The invention relates to hoisting machines, and hoisting machine power supply. Particularly, the invention relates to an elevator line bridge filter for compensating reactive power in a grid.

Description of the Related Art

An elevator does work also when an elevator car is braked. The work done is usually lost as heat. The braking may be used to produce electrical power. Currently, the electrical power produced is not utilized.

In a power supply system loads may also have a combination of resistive, capacitive or inductive nature. Power may also flow towards the source. For example, electrical motors and lighting equipment have inductive coils which function as inductive load. The power caused by inductive or capacitive loads is referred to as reactive power. When reactive power is present, there is a phase difference between voltage and current. Reactive power causes rise in current value in the internal grid of the building and therefore causes heating in power transmission lines and all kinds of power supply lines of the building.

A building automation system controls a plurality of electricity consuming subsystems in a building. The building automation system monitors and controls several subsystems of the building such as lighting, heating, air-conditioning and security. A building automation system comprises at least one computer, which is referred to as a building automation server. The server is connected to a plurality of sensors that monitor the proper functioning of the aforementioned subsystems. The building automation system may also measure use of electrical power in the aforementioned subsystems. Some of the aforementioned subsystems may have reactive or inductive loads which give rise to reactive power, which returns to the power source such as a grid unless it compensated. The building automation system may also measure reactive power.

Therefore, it would be beneficial to have a solution which enables a building automation system to perform compensation for reactive power. It would be beneficial if an elevator system was able to compensate reactive power produced by a plurality of building subsystems.

SUMMARY OF THE INVENTION

According to an aspect of the invention, the invention is a method comprising: determining, by a controller of an electrical converter, a first reactive power produced by a smoothing filter using pre-determined information on impedance of the smoothing filter, the smoothing filter being electrically connected via a three-phase electrical connection to a converter matrix of the electrical converter of an elevator, the smoothing filter being electrically connected via a three-phase connection to a grid, the converter matrix producing pulse width modulated three-phase output voltages to the smoothing filter; and requesting, by the controller, the electrical converter to make a plurality of first compensative electrical connections in the converter matrix to compensate the first reactive power.

According to a further aspect of the invention, the invention is an electrical converter of an elevator, the electrical converter comprising: a smoothing filter configured to smooth three-phase output currents, the smoothing filter being electrically connected via a three-phase electrical connection to a converter matrix, the smoothing filter being electrically connected via a three-phase electrical connection to a grid; a converter matrix configured to produce the pulse width modulated three-phase output voltages to the smoothing filter, to make a plurality of connections in the converter matrix to compensate reactive power; and a controller configured to determine a first reactive power produced by a smoothing filter using pre-determined information on impedance of the smoothing filter and to request the electrical converter to make the plurality of first compensative connections in the converter matrix to compensate the first reactive power.

According to a further aspect of the invention, the invention is an elevator comprising the electrical converter.

According to a further aspect of the invention, the invention is an elevator group comprising the elevator.

In one embodiment of the invention, the converter may be a line bridge in which the converter matrix is replaced with a plurality of IGBT transistors of the line bridge. The IGBT transistors may be seen to form a matrix of the line bridge.

In one embodiment of the invention, the method further comprises: receiving, by the controller, information on a second reactive power from a remote node over a communication channel, the second reactive power being produced to the grid; adding, by the controller, the first reactive power and the second reactive power to yield a total reactive power; and requesting, by the controller, the electrical converter to make a plurality of second compensative connections in the converter matrix to compensate the total reactive power.

In one embodiment of the invention, the controller is configured to receive information on a second reactive power from a remote node over a communication channel, the second reactive power being produced to the grid, to add the first reactive power and the second reactive power to a yield a total reactive power, and to request the electrical converter to make a plurality of second compensative connections in the converter matrix to compensate the total reactive power.

In one embodiment of the invention, the step of determining the first reactive power further comprises: measuring a phase to neutral voltage by the controller in the grid; measuring a phase current by the controller in at least one of the grid and the three-phase electrical connected between the smoothing filter and the converter matrix; and determining, by the controller, the first reactive power using the pre-determined information on impedance of the smoothing filter, the phase to neutral voltage and the phase current.

In one embodiment of the invention, the smoothing filter is an LCL filter. The LCL filter may comprise a plurality of inductors (L) and a plurality of capacitors (C).

In one embodiment of the invention, the grid is an internal grid of a building, an factory, or a ship.

In one embodiment of the invention, the remote node is a building automation system server.

In one embodiment of the invention, the second reactive power is produced to the grid by at least one building electrical subsystem.

In one embodiment of the invention, the at least one building electrical subsystem comprises lighting, heating, air circulation and access control.

In one embodiment of the invention, the method further comprises: determining a voltage drop in a voltage of the grid; and making a plurality of connections in the converter matrix to regulate the voltage of the grid.

In one embodiment of the invention, the first reactive power is determined for three phases, the information on the second reactive power comprises information on three-phases and the total reactive power is computed for three phases.

In one embodiment of the invention, the converter matrix is electrically connected to an inverter bridge via a direct current connection and the inverter bridge is electrically connected to an electrical motor of the elevator.

The embodiments of the invention described hereinbefore may be used in any combination with each other. At least two of the embodiments may be combined together to form a further embodiment of the invention. A method, an electrical converter and an elevator to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

The benefits of the invention are related to possibility of utilizing an elevator electrical converter to compensate for reactive power in a grid.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
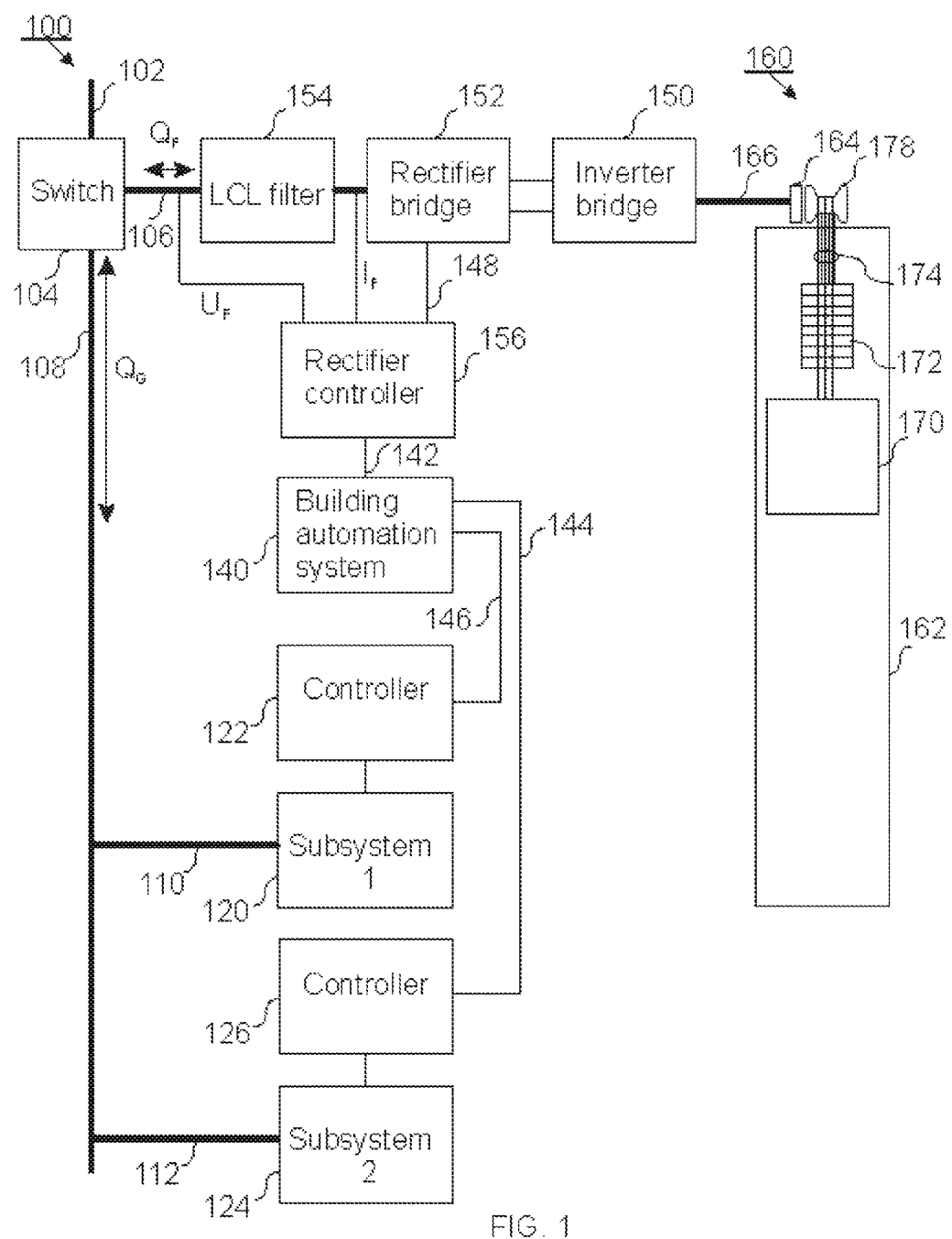
FIG. 1 is a block diagram illustrating an elevator line bridge controller configured to communicate with a building automation system computer node in one embodiment of the invention.

FIG. 1 is a block diagram illustrating an elevator line bridge controller configured to communicate with a building automation system computer node in one embodiment of the invention.

In FIG. 1 there is illustrated an electrical system 100. The system comprises an external grid 102. Grid 102 may be the grid of a power company or other commercial or non-commercial electricity distributor. There is also a switch 104 which connects electrically external grid 102 to an internal grid 108. External grid 102 may be a three-phase electrical grid. To switch 104 is electrically connected to a filter 154 via electrical connection 106. Electrical connection 106 may be a three-phase electrical connection. Filter 154 may be an LCL filter. Filter 154 is configured to provide three-phase electrical current to electrical connection 106. Filter 154 may receive a pulse-width modulated three-phase electrical current from a line bridge 152 of elevator 160. Filter 154 performs smoothing of the pulse-width modulated three-phase electrical current and outputs a smoothed three-phase electrical current to electrical connection 106 to switch 102. Line bridge 152 has a Direct Current (DC) electrical connection to an inverter bridge 150 of elevator 160. Inverter bridge 150 has a three-phase electrical connection 166 to an electrical motor 164 that may drive a traction sheave 178 of elevator 160. Elevator 160 comprises a hoistway 162 in which an elevator car 170 is hoisted. In hoistway 162 there is also a counterweight 172 and traction means 174 looped over traction sheave 178 and connected to elevator car 170 on one end and to counterweight 172 on the other end. Traction means 174 may comprise a plurality of traction ropes or a traction belt.

Line bridge 152 is controlled by a line bridge controller 156. Line bridge controller 156 is configured to control a plurality of Insulated-Gate Bipolar Transistors (IGBT) transistors in line bridge 152. Line bridge controller 156 is connected to line bridge 152. Line bridge controller 156 provides instructions to line bridge 152 to switch a plurality of IGBT transistors in line bridge 152. The instructions may be in the form a signal from a Pulse Width Modulation (PWD) comparator circuit (not shown), which compares a modulating signal to a carrier signal. Line bridge 152 may control the gate voltages of the IGBT transistors based on the instructions. Line bridge controller 156 is also configured to measure phase to neutral voltage $U_F$ in electrical connection 106. Line bridge controller 156 is also configured to measure phase current $I_F$ in the electrical connection between filter 154 and line bridge 152. Line bridge controller 156 may also measure phase current $I_F$ alternatively in electrical connection 106. Line bridge controller 156 is preconfigured with information on inductive and capacitive components and their connections in filter 154, for example, impedance of filter 154. Line bridge controller 156 determines reactive power due $Q_F$ to filter 154 based on the impedance of filter 154, current $I_F$ and voltage $U_F$. Line bridge controller 156 is able to determine necessary compensation for reactive power $Q_F$. To perform the compensation line bridge controller 156 is configured to control the plurality of IGBT transistors in line bridge 152 via connection 148. Line bridge 156 may send gate control signals in the form of PWM modulation to line bridge 152. The gate control signals specifies which transistors in line bridge 152 must be switched on to achieve compensating connections in line bridge 152 that compensate reactive power $Q_F$.

Line bridge controller 156 is connected via a message bus 142 or other communication channel to a Building Automation System (BAS) server 140. Server 140 may also be any computer node, which is communicatively connected to line bridge controller 156. Server 140 is communicatively connected to a controller 122 over communication channel 146. Server 140 is also communicatively connected to controller 126 over communication channel 144. Communication channels 144 and 146 may be wired or wireless communication channels, for example, wired or wireless local area networks or message busses. Controller 122 controls a first subsystem 120 in the building automation system, whereas controller 126 controls a second subsystem 124 in the building automation system. Examples of types of subsystems comprise lighting, heating, ventilation and access control. First subsystem 120 is electrically connected to internal grid 108 via three-phase electrical connection 110. Second subsystem 124 is electrically connected to internal grid 108 via three-phase electrical connection 112.

In FIG. 1 line bridge controller 156 is configured to control the plurality of IGBT transistors in line bridge 152 to compensate for reactive power $Q_G$ measured to be present in internal grid 108. Line bridge 152 obtains the information on reactive power in internal grid 108 in order to control the plurality of transistors in line bridge 152. Line bridge 152 obtains the information on reactive power in internal grid 108 from server 140.

The starting point for determining the necessary reactive power compensation is that controllers 122 and 126 measure reactive power produced in their respective subsystems 120 and 124. Controller 122 provides information on the measured reactive power produced in subsystem 120 to server 140 over communication channel 146. Similarly, controller 126 provides information on the measured reactive power produced in subsystem 124 to server over communication channel 144. Server 140 determines the overall reactive power $Q_G$ produced to internal grid 108 by summing the reactive powers produced in subsystems 120 and 124. Server 140 provides information on the overall reactive power in internal grid 108 to line bridge controller 156. Line bridge controller 156 sums the overall reactive power $Q_G$ and reactive power $Q_F$ produced by filter 154. Line bridge controller 156 is able to determine necessary compensation for reactive power $Q_F+Q_G$. To perform the compensation line bridge controller 156 is configured to control the plurality of transistors in line bridge 152 via connection 148. Line bridge controller 156 may send a control signal over connection 148 to line bridge 152. The control signal specifies which transistors in line bridge 152 must be switched on to achieve compensating connections in line bridge 152 that compensate reactive power $Q_F+Q_G$.

Figure 2:
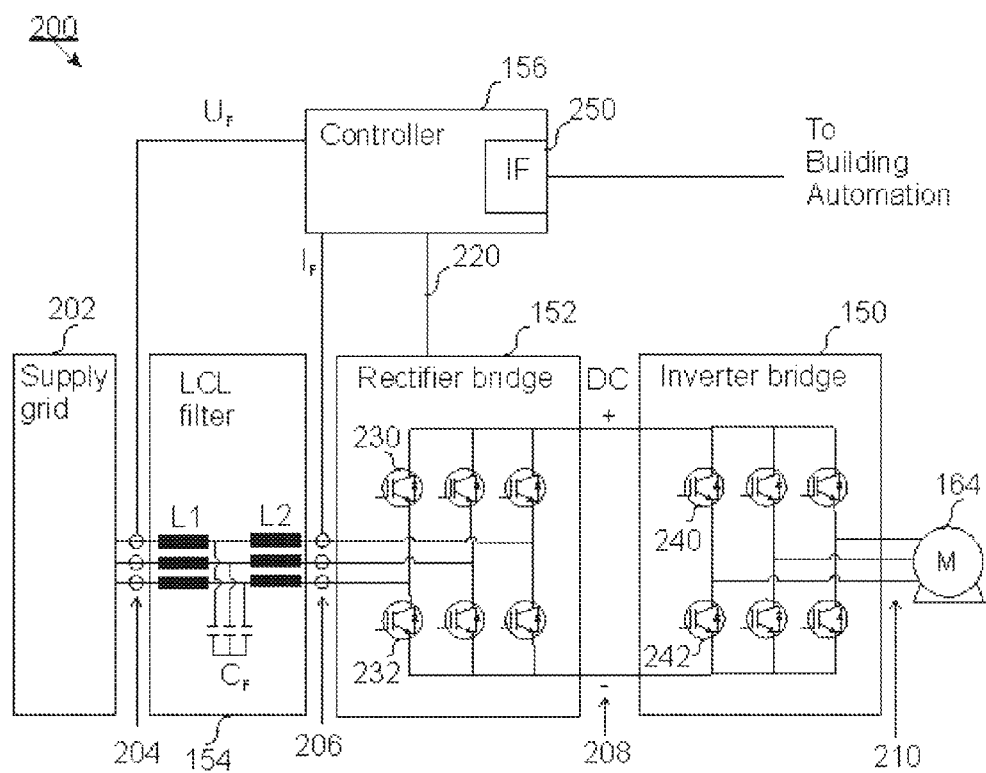
FIG. 2 illustrates an elevator reactive power compensation system in one embodiment of the invention.

FIG. 2 illustrates an elevator reactive power compensation system 200 in one embodiment of the invention.

In FIG. 2 there is a supply grid 202. Supply grid 202 may comprise at least one subsystem (not shown) which produces reactive power. The reactive power produced must be compensated. In FIG. 2 there is also illustrated filter 154, which also produces reactive power due to reactive load in filter 154. Filter 154 may be an LCL filter. Filter 154 may comprise inductors L1 for three phases, capacitors $C_f$ for three phases and inductors L2 for three phases. Supply grid 202 is connected to filter 154 via three-phase electrical connection 204. Filter 154 is connected to line bridge 152 via three-phase electrical connection 206. Line bridge 152 is connected via a DC electrical connection 208 to inverter bridge 150. Line bridge 152 may also be referred to as an electrical converter, which comprises a converter matrix, to which filter 154 is connected via three-phase electrical connection 206, and, to which inverter bridge 150 is connected via DC electrical connection 208. Inverter bridge 150 is connected via three-phase electrical connection 210 to electrical motor 164. Inverter bridge 150 comprises a plurality of IGBT transistors such as transistors 240 and 242. The plurality of IGBT transistors such as transistors 240 and 242 may be referred to as a converter matrix. Line bridge 152 is controlled by line bridge controller 156 via a communication channel 220, which may be a message bus. Line bridge controller 156 is configured to control a plurality of IGBT transistors such as transistors 230 and 232 in line bridge 152 via communication channel 220. Line bridge 152 is controlled by PWM control pulses from line bridge controller 156 to determine target states for the plurality of transistors. Line bridge 152 supplies gate voltages to the plurality of IGBT transistors based on the PWM control signals. The gate voltage causes the transistors to turn on or off depending on the voltage level. For example, a positive gate voltage, for example, +15 V, may cause a transistor to turn on and negative gate voltage, for example, −5 V, may cause the transistor to turn off. Line bridge controller 156 comprises a communication channel interface 250, for example, a message bus interface. Communication channel interface 250 may be used to communicate with a building automation system, which may comprise a server. Line bridge controller 156 is configured to receive via communication channel interface 250 at least one message, which comprises information on reactive power in supply grid 202. Line bridge controller 156 is also configured to measure phase to neutral voltage $U_F$ in three-phase electrical connection 204. Line bridge controller 156 is also configured to measure phase current $I_F$ in the three-phase electrical connection 206 between filter 154 and line bridge 152. Line bridge controller 156 may also measure phase current $I_F$ alternatively in electrical connection 204. Line bridge controller 156 may be preconfigured with information on inductive and capacitive components and their connections in filter 154, for example, impedance of filter 154. Line bridge controller 156 determines reactive power $Q_F$ due to filter 154 based on the impedance of filter 154, current $I_F$ and voltage $U_F$. Line bridge controller 156 is able to determine necessary compensation for reactive power produced by filter 154. To perform the compensation line bridge controller 156 is configured to control the plurality of transistors in line bridge 152 via connection 220. Line bridge controller 156 may sum reactive powers in supply grid 202 and reactive power produced by filter 154 to obtain total reactive power. To perform the compensation for the total reactive power, line bridge controller 156 is configured to control the plurality of IGBT transistors in line bridge 152 via connection 220.

The embodiments of the invention described hereinbefore in association with FIGS. 1 and 2 may be used in any combination with each other. Several of the embodiments may be combined together to form a further embodiment of the invention.

Figure 3:
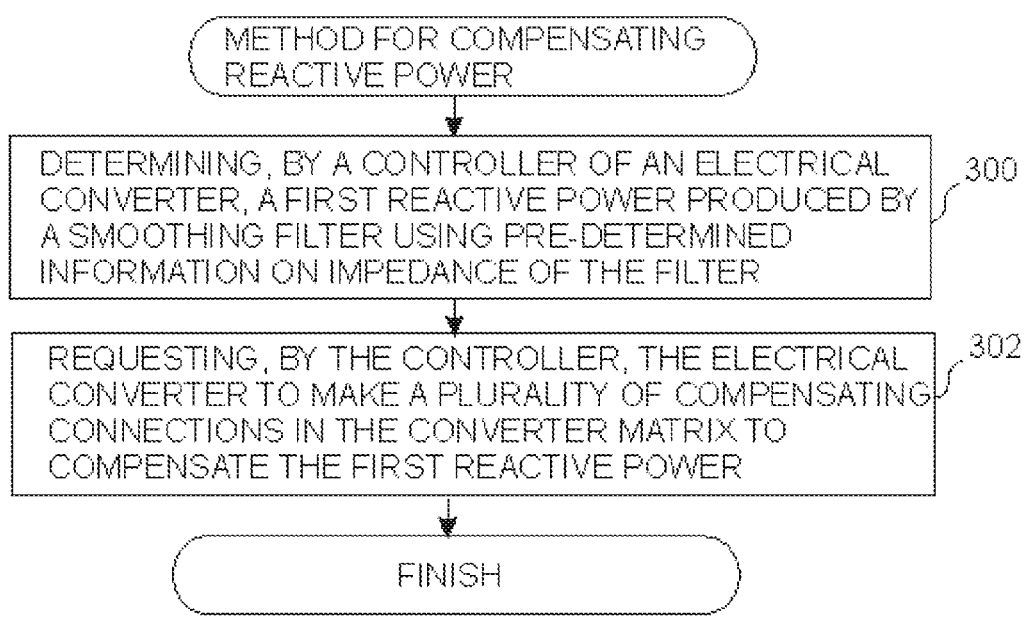
FIG. 3 is a flow chart illustrating a method for reactive power compensation in one embodiment of the invention.

FIG. 3 is a flow chart illustrating a method for reactive power compensation in one embodiment of the invention.

At step 300 a reactive power produced by a smoothing filter is determined by a controller of an electrical converter. The determination may use pre-determined information on impedance of the smoothing filter. The smoothing filter may be electrically connected via a three-phase electrical connection to a converter matrix of the electrical converter. The smoothing filter may also be electrically connected via a three-phase electrical connection to a grid. The converter matrix may produce pulse width modulated three-phase output voltages.

At step 302 the controller requests the electrical converter to make a plurality of compensative connections in the converter matrix to compensate the first reactive power.

In one embodiment of the invention, the controller receives from a remote node over a communication channel information of a second reactive power. The second reactive power may be produced to the grid by at least one subsystem connected to the grid. The first reactive power is added to the second reactive power to yield a total reactive power. The controller requests the electrical converter to make a plurality of compensative second connections in the converter matrix to compensate the total reactive power.

In one embodiment of the invention, the steps may be performed in numeric order.

The embodiments of the invention described hereinbefore in association with FIGS. 1, 2 and 3 and the summary of the invention may be used in any combination with each other. At least two of the embodiments may be combined together to form a further embodiment of the invention.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   determining, by a controller of an electrical converter, a first reactive power produced by a smoothing filter using pre-determined information on impedance of the smoothing filter, the smoothing filter being electrically connected via a three-phase electrical connection to a converter matrix of the electrical converter of an elevator, the smoothing filter being electrically connected via a three-phase connection to a grid, the converter matrix producing pulse width modulated three-phase output voltages to the smoothing filter; and
   requesting, by the controller, the electrical converter to make a plurality of first compensative electrical connections in the converter matrix to compensate the first reactive power.

2. The method according to claim 1, the method further comprising:
   receiving, by the controller, information on a second reactive power from a remote node over a communication channel, the second reactive power being produced to the grid;
   adding, by the controller, the first reactive power and the second reactive power to yield a total reactive power; and
   requesting, by the controller, the electrical converter to make a plurality of second compensative connections in the converter matrix to compensate the total reactive power.

3. The method according to claim 1, the step of determining the first reactive power further comprising:
   measuring a phase to neutral voltage by the controller in the grid; and
   measuring a phase current by the controller in at least one of the grid and the three-phase electrical connection between the smoothing filter and the converter matrix; and
   determining, by the controller, the first reactive power using the pre-determined information on impedance of the smoothing filter, the phase to neutral voltage and the phase current.

4. The method according to claim 1, wherein the smoothing filter is an LCL filter.

5. The method according to claim 1, wherein the grid is an internal grid of a building.

6. The method according to claim 1, wherein the remote node is a building automation system server.

7. The method according to claim 1, wherein the second reactive power is produced to the grid by at least one building electrical subsystem.

8. The method according to claim 7, wherein the at least one building electrical subsystem comprises lighting, heating, air circulation and access control.

9. The method according to claim 1, the method further comprising:
   determining a voltage drop in a voltage of the grid; and
   making a plurality of connections in the converter matrix to regulate the voltage of the grid.

10. The method according to claim 1, wherein the first reactive power is determined for three phases, the information on the second reactive power comprises information on three-phases and the total reactive power is computed for three phases.

11. The method according to claim 1, wherein the converter matrix is electrically connected to an inverter bridge via a direct current connection and the inverter bridge is electrically connected to an electrical motor of the elevator.

12. An electrical converter of an elevator, the electrical converter comprising:
   a smoothing filter configured to smooth three-phase output currents, the smoothing filter being electrically connected via a three-phase electrical connection to a converter matrix, the smoothing filter being electrically connected via a three-phase electrical connection to a grid;
   a converter matrix configured to produce the pulse width modulated three-phase output voltages to the smoothing filter, to make a plurality of connections in the converter matrix to compensate reactive power; and
   a controller configured to determine a first reactive power produced by a smoothing filter using pre-determined information on impedance of the smoothing filter and to request the electrical converter to make the plurality of first compensative connections in the converter matrix to compensate the first reactive power.

13. The electrical converter of claim 12, wherein the controller is configured to receive information on a second reactive power from a remote node over a communication channel, the second reactive power being produced to the grid, to add the first reactive power and the second reactive power to a yield a total reactive power, and to request the electrical converter to make a plurality of second compensative connections in the converter matrix to compensate the total reactive power.

14. An elevator comprising the elevator electrical converter according to claim 12.

15. An elevator group comprising the elevator according to claim 14.

16. The method according to claim 2, the step of determining the first reactive power further comprising:
   measuring a phase to neutral voltage by the controller in the grid; and
   measuring a phase current by the controller in at least one of the grid and the three-phase electrical connection between the smoothing filter and the converter matrix; and
   determining, by the controller, the first reactive power using the pre-determined information on impedance of the smoothing filter, the phase to neutral voltage and the phase current.

17. The method according to claim 2, wherein the smoothing filter is an LCL filter.

18. The method according to claim 3, wherein the smoothing filter is an LCL filter.

19. The method according to claim 2, wherein the grid is an internal grid of a building.

20. The method according to claim 3, wherein the grid is an internal grid of a building.

\* \* \* \* \*